United States Patent
Dong

(10) Patent No.: US 12,317,359 B2
(45) Date of Patent: May 27, 2025

(54) METHOD, APPARATUS, AND COMMUNICATION DEVICE FOR DATA TRANSMISSION

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 268 days.

(21) Appl. No.: 17/996,057

(22) PCT Filed: Apr. 13, 2020

(86) PCT No.: PCT/CN2020/084516
§ 371 (c)(1),
(2) Date: Oct. 12, 2022

(87) PCT Pub. No.: WO2021/207884
PCT Pub. Date: Oct. 21, 2021

(65) Prior Publication Data
US 2023/0209637 A1    Jun. 29, 2023

(51) Int. Cl.
*H04W 76/20* (2018.01)
*H04L 1/16* (2023.01)
*H04L 1/1607* (2023.01)
*H04L 5/00* (2006.01)

(52) U.S. Cl.
CPC ........... *H04W 76/20* (2018.02); *H04L 1/1642* (2013.01); *H04L 5/0053* (2013.01)

(58) Field of Classification Search
None
See application file for complete search history.

(56) References Cited

U.S. PATENT DOCUMENTS

| | | |
|---|---|---|
| 2018/0317130 A1 | 11/2018 | Jin et al. |
| 2020/0077299 A1 | 3/2020 | Wu et al. |
| 2020/0213904 A1 | 7/2020 | Jin et al. |

FOREIGN PATENT DOCUMENTS

| | | | | |
|---|---|---|---|---|
| CN | 101569148 A | 10/2009 | | |
| CN | 104704884 A | 6/2015 | | |
| CN | 107211312 A | 9/2017 | | |
| CN | 109756306 A | * 5/2019 | ............... | H04L 1/16 |
| CN | 110612739 A | 12/2019 | | |

(Continued)

OTHER PUBLICATIONS

"Data transmission in inactive state. option A vs. option B," Huawei et al., *3GPP TSG-RAN WG2 # Adhoc R2-1700188*, Nov. 14-18, 2016, 6 pages.

(Continued)

*Primary Examiner* — Yemane Mesfin
*Assistant Examiner* — Jeff Banthrongsack
(74) *Attorney, Agent, or Firm* — Oblon, McClelland, Maier & Neustadt, L.L.P.

(57) ABSTRACT

A method for data transmission is provided. The method includes: in response to the UE being in an inactive state, transmitting a first type acknowledged mode data protocol data unit (AMD PDU), wherein a bit length of a sequence number field of first type AMD PDU is less than a bit length of a sequence number field of a second type AMD PDU used in a connected state.

16 Claims, 5 Drawing Sheets

```
┌─────────────────┐                                    ┌──────────────┐
│ User Equipment  │                                    │ Base Station │
└─────────────────┘                                    └──────────────┘
```

701: In response to the UE being in an inactive state, a first type AMD PDU is transmitted, a bit length of a sequence number field of the first type AMD PDU is less than a bit length of a sequence number field of a second type AMD PDU used in a connected state.

702: The RLC SDU is buffered in a RLC layer of the UE, wherein the buffered RLC SDU is used for retransmission when the transmission of the first type AMD PDU fails.

(56) References Cited

FOREIGN PATENT DOCUMENTS

WO     WO 2012/100670 A1     8/2012

OTHER PUBLICATIONS

3GPP. "3rd Generation Partnership Project; 3rd Generation Partnership Project; NR; Radio Link Control (RLC) protocol specification (Release 16)" *3GPP TS 38.322 V16.0.0(Mar. 2020)*, Mar. 31, 2020, 33 pages.

International Search Report with English translation mailed on Dec. 28, 2020 in PCT/CN2020/084516 filed on Apr. 13, 2020 (citing references 1-3, 15-17 & 23-24 therein, 4 pages).

Written Opinion issued Dec. 28, 2020, in PCT/CN2020/084516 (with English Translation), 6 pages.

Qualcomm Incorporated, "Remaining RLC PDU formats", 3GPP TSG-RAN WG2 Meeting #99, R2-1708292, Berlin, Germany, Aug. 21-25, 2017, 4 pages.

\* cited by examiner

METHOD, APPARATUS, AND COMMUNICATION DEVICE FOR DATA TRANSMISSION

CROSS REFERENCE TO RELATED APPLICATIONS

This application is the national phase of International Application No. PCT/CN2020/084516 filed on Apr. 13, 2020, the disclosure of which is hereby incorporated by reference in its entirety.

BACKGROUND OF THE INVENTION

Field of the Invention

The present disclosure relates to, but is not limited to, the field of radio communication technologies, and in particular to a method and an apparatus for data transmission, and a communication device.

Description of the Related Art

When user equipment (UE) transitions from a radio resource control (RRC) idle state or an RRC inactive state to an RRC connected state, great signaling overhead is required. The signaling overhead is greater than the overhead of small data transmission perform by the UE, which is not conducive to power saving of the UE.

In the field of communication, in order to save power consumption of the UE, method for small data transmission performed by the UE in the RRC inactive state will be defined. The small data transmission can be implemented in a four-step random access mechanism or a two-step random access mechanism by a random access channel (RACH).

In the four-step random access mechanism shown in FIG. 1, the small data transmission can be implemented in step 103. In the two-step random access mechanism shown in FIG. 2, the small data transmission can be implemented in step 203.

SUMMARY OF THE INVENTION

The present disclosure provide a method and an apparatus for data transmission, and a communication device.

According to a first aspect of the present disclosure, there is provided a method for data transmission, being applicable to user equipment (UE), including:

in response to the UE being in an inactive state, transmitting a first type acknowledged mode data protocol data unit (AMD PDU), wherein a bit length of a sequence number field of the first type AMD PDU is less than a bit length of a sequence number field of a second type AMD PDU used in a connected state.

According to a second aspect of the present disclosure, there is provided a method for data transmission, being applicable to a base station, including:

receiving a first type acknowledged mode data protocol data unit (AMD PDU), wherein the first type AMD PDU is transmitted by user equipment (UE) in an inactive state, and a bit length of a sequence number field of the first type AMD PDU is less than a bit length of a sequence number field of a second type AMD PDU used in a connected state.

According to a third aspect of the present disclosure, there is provided a communication device including: a processor, a transceiver, a memory and an executable program stored in the memory and capable of being run on the processor, the processor, when executing the executable program, executing the steps of the method for data transmission according to the first aspect.

According to a fourth aspect of the present disclosure, there is provided a communication device including: a processor, a transceiver, a memory and an executable program stored in the memory and capable of being run on the processor, the processor, when executing the executable program, executing the steps of the method for data transmission according to the second aspect.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE PREFERRED EMBODIMENTS

Embodiments will be described in detail here, examples of which are illustrated in the accompanying drawings.

When the following description refers to the drawings, unless otherwise indicated, the same numerals in different drawings indicate the same or similar elements. The implementations set forth in the following description of embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only used for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be used to describe various information in the embodiments of the present disclosure, the information should not be limited to these terms. These terms are only used to distinguish the same type of information. For example, first information may also be referred to as second information, and similarly, the second information may also be referred to as the first information without departing from the scope of the embodiments of the present, disclosure. For example, terms "if" and "in case of" used herein may be explained as "while" or "when" or "responsive to determining", which depends on the context.

Figure 1:
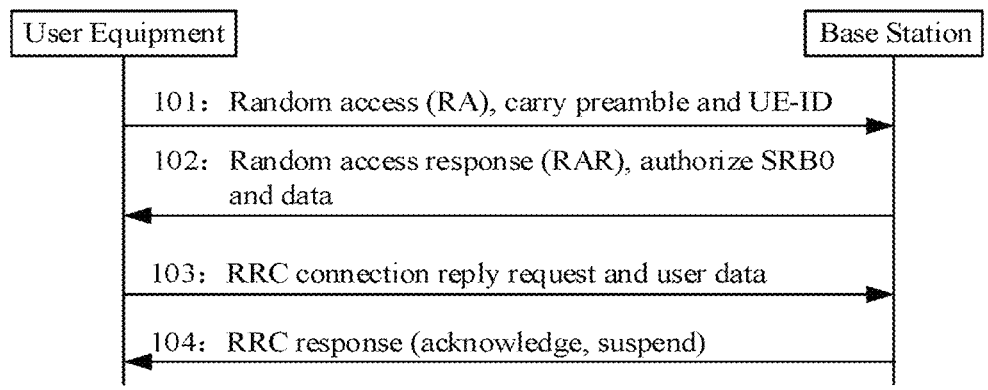
FIG. 1 is a schematic flowchart illustrating specific steps of a random access mechanism according to an embodiment.
Figure 2:
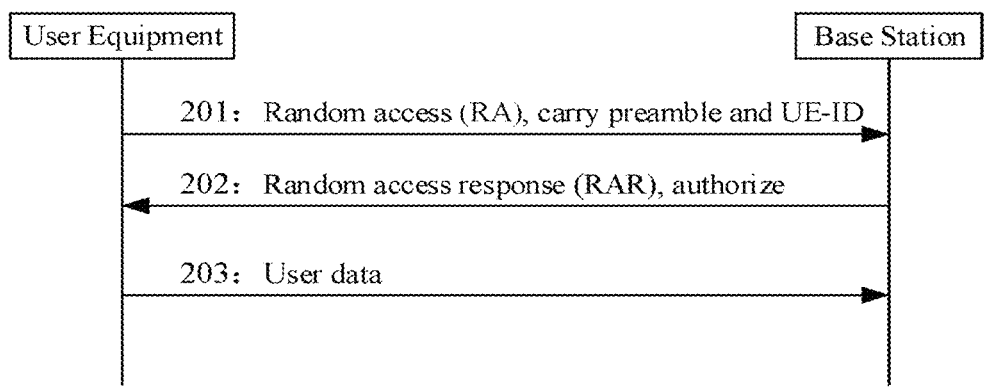
FIG. 2 is a schematic flowchart illustrating specific steps of a random access mechanism according to an embodiment.
Figure 3:
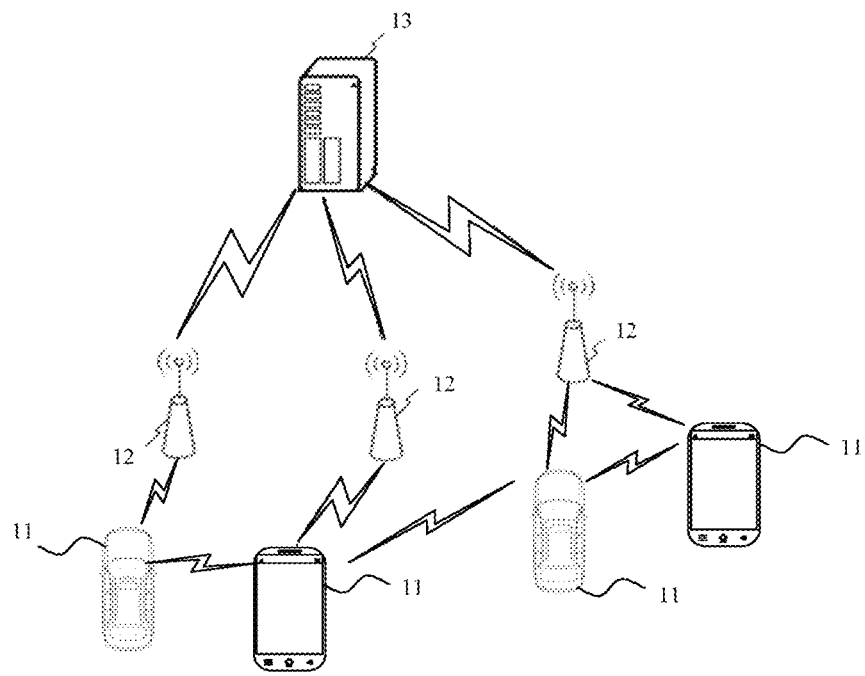
FIG. 3 is a schematic structural diagram illustrating a radio communication system according to an embodiment.

Referring to FIG. 3, which is a schematic structural diagram illustrating a radio communication system according to an embodiment of the present disclosure. As shown in FIG. 3, the radio communication system is a cellular mobile communication technology-based communication system, and the radio communication system may include several terminals 11 and several base stations 12.

The terminal 11 may be a device that provides voice and/or data connectivity to a user. The terminal 11 may communicate with one or more core networks via a radio access network (RAN). The terminal 11 may be an Internet of Things (IoT) terminal such as a sensor device, a mobile phone (or referred to as a "cellular" phone), and a computer having the IoT terminal. For example, the terminal 11 may be a fixed, portable, pocket-sized, handheld, computer-built-in, or vehicle-mounted device, for example, a Station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be an unmanned aerial vehicle device. Alternatively, the terminal 11 may also be a vehicle-mounted device, for example, a trip computer with a wireless communication function, or a wireless communication device connected to the trip computer. Alternatively, the terminal 11 may also be a roadside device, for example, a street lamp, a signal lamp, or other roadside devices with a wireless communication function.

The base station 12 may be a network side device in a radio communication system. The radio communication system may be a fourth generation mobile communication technology (4th generation mobile communication, 4G) system, which is also referred to as a Long Term Evolution (LTE) system. Alternatively, the radio communication system may also be a 5G system, which is also referred to as a new radio (NR) system or a 5G NR system. Alternatively, the radio communication system may be a next generation system of the 5G system, wherein an access network in the 5G system can be called a New Generation-Radio Access Network (NG-RAN); or, a Machine-Type Communication (MTC) system.

The base station 12 may be an evolved NodeB (eNB) in the 4G system. Alternatively, the base station 12 also be a base station (gNB) having a centralized-distributed architecture in the 50 system. When the base station 12 uses a centralized-distributed architecture, the base station 12 typically includes a Central Unit (CU) and at least two Distributed Units (DUs). Protocol stacks of a Packet Data Convergence Protocol (PDCP) layer, a Radio Link Control (RLC) layer, and a Media Access Control (MAC) layer are set in the central unit. A protocol stack of a Physical (PIN) layer is set in the distributed unit, and the specific implementation of the base station 12 is not limited in the embodiments of the present disclosure.

A wireless connection may be established between the base station 12 and the terminal 11 through a radio air interface. In various embodiments, the radio air interface is a radio air interface based on based on the fourth generation mobile communication network technology (4G) standard; alternatively, the radio air interface is a radio air interface based on the fifth generation mobile communication network technology (5G) standard. For example, the radio air interface is the New Radio; alternatively, the radio air interface may be a radio air interface based on the next generation mobile communication network technical standard of 5G.

In some embodiments, an End to End (E2E) connection may also be established among the terminals 11. For example, a Vehicle to Vehicle (V2V) communication, a Vehicle to Infrastructure (V2I) communication, and a Vehicle to Pedestrian (V2P) communication in a Vehicle to Everything (V2X) communication, and other scenarios.

In some embodiments, the above radio communication system may further include a network management device 13.

Several base stations 12 are respectively connected to the network management device 13. Herein, the network management device 13 may be a core network device in a radio communication system. For example, the network management device 13 may be a Mobility Management Entity (MME) in an Evolved Packet Core (EPC). Alternatively, the network management device may also be other core network devices, such as a Serving Gate Way (SGW), a Public Data Network Gate Way (PGW), a Policy and Charging Rules Function (PCRF), or a Home Subscriber Server (HSS). The implementation of the network management device 13 is not limited by the embodiments of the present disclosure.

Executive bodies involved in the embodiments of the present disclosure include, but are not limited to, user equipment (UE) such as terminals supporting cellular mobile communication technology and base stations.

An application scenario of the embodiments of the present: disclosure is that when the UE in an RRC inactive state transmits small data, since an amount of transmitted data is relatively small, a form of an RR resume request combined with the small C data is generally used. The RRC resume request is carried by a signaling radio bearer (SRF) 0 bearer and transmitted using common control channel (CCCH) resources. Here, the CCCH may include a bidirectional control channel in cellular communication, which usually transmits control signaling, and information required for a link connection in an access phase.

In a working identifier (WID) of the small data, the definition for the transmission of the small data in the CCCH is that it can exceed a size of existing CCCH by 64 or 48 bits. The purpose of the UE in the RRC inactive state using a signaling of an initial access network to carry the small data is to reduce latency and save the power of the UE. Therefore, it is necessary to transmit as much small data as possible.

Data transmitted by the CCCH resources is not encapsulated in a packet data convergence protocol (PDCP) layer, but is encapsulated in a radio link control (RIX) layer.

In the RLC layer, a RIX protocol data unit (PDU) is divided into three types, i.e., a transparent mode data (TMD) PDU, an unacknowledged mode data (UMD) PDU and an acknowledged mode data (AMD) PDU.

Figure 4:
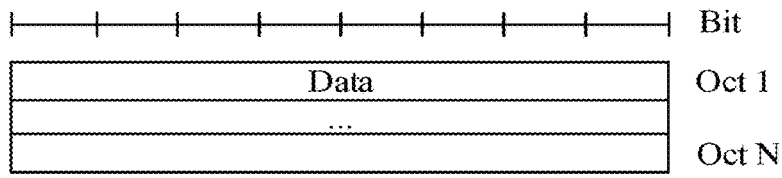
FIG. 4 is a schematic diagram illustrating a frame structure of a transparent mode data protocol data unit according, to an embodiment.
Figure 5A:
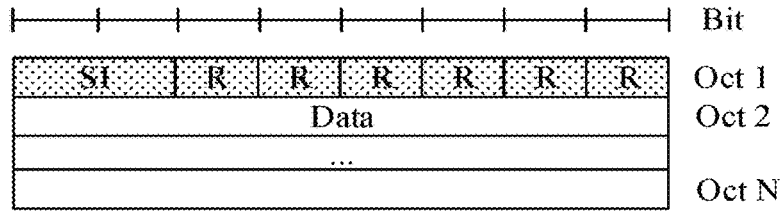
FIG. 5a is a schematic diagram illustrating a fame structure of an unacknowledged mode data protocol data unit according to an embodiment.
Figure 5B:
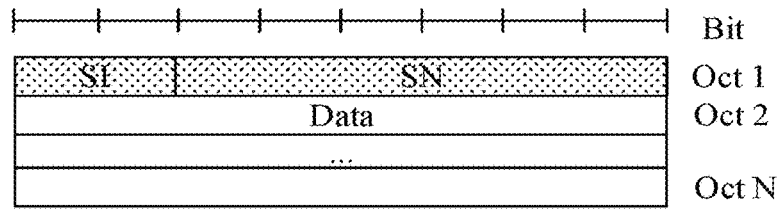
FIG. 5b is a schematic diagram illustrating a frame structure of an unacknowledged mode data protocol data unit according to an embodiment.
Figure 5C:
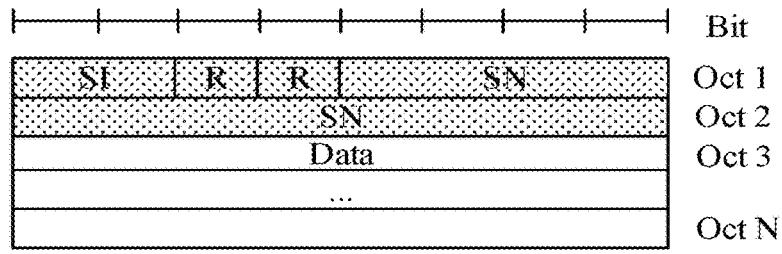
FIG. 5c is a schematic diagram illustrating a frame structure of an unacknowledged mode data protocol data unit according to an embodiment.
Figure 6A:
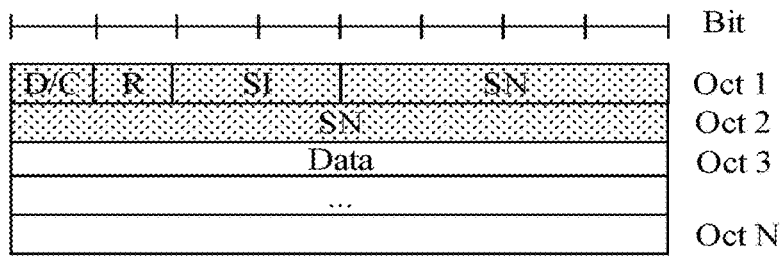
FIG. 6a is a schematic diagram illustrating a frame structure of an acknowledged mode data protocol data unit according to an embodiment.
Figure 6B:
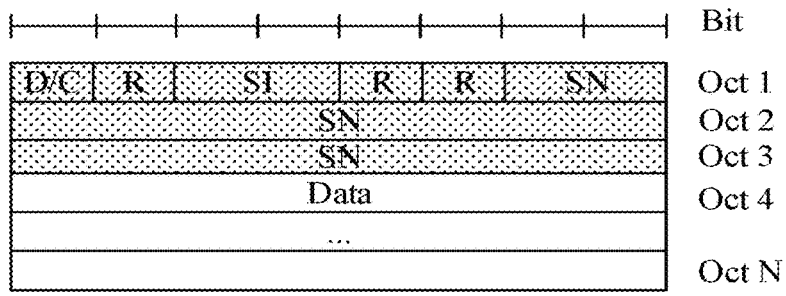
FIG. 6b is a schematic diagram illustrating a frame structure of an acknowledged mode data protocol data unit according to an embodiment.

Frame structures of the three types of the PDUs are shown in FIG. 4 to FIG. 6, among which the frame structure of the TMD PDU is shown in FIG. 4, the frame structure of the UMD PDU with a complete RLC SDU is shown in FIG. 5a, the frame structure of the UMD PDU with 6 bits occupied by a SN field is shown in FIG. 5b, and the frame structure of the UMD PDU with 12 bits occupied by the SN field is shown in FIG. 5c, the frame structure of the AMD PDU with 12 bits occupied by the SN field is shown in FIG. 6a, and the frame structure of the AML) PDU with 18 bits occupied by the SN field is, shown in FIG. 6b.

On the one hand, among the three types of the PDUs in the RLC layer, only the TMD PDU can be transmitted by the CCCH resources. However, the TMD PDU does not have an RLC header, therefore, retransmission of the RLC layer can be required in the process of the small data transmission. Since the TMD PDU without the RLC header lacks corresponding retransmission information, the retransmission is prone to errors.

On the other hand, bits occupied by a sequence number (SN) field of the AMD PDU can reach 18 bits. However, for small data transmitted by initial access signaling, since a small amount of data is transmitted (that is, a small number of data frames is transmitted), there is no need to divide into so many sequences, and excessively occupied bits in the SN field will reduce the amount of data of the small data carried in the AMD PDU.

Figure 7:
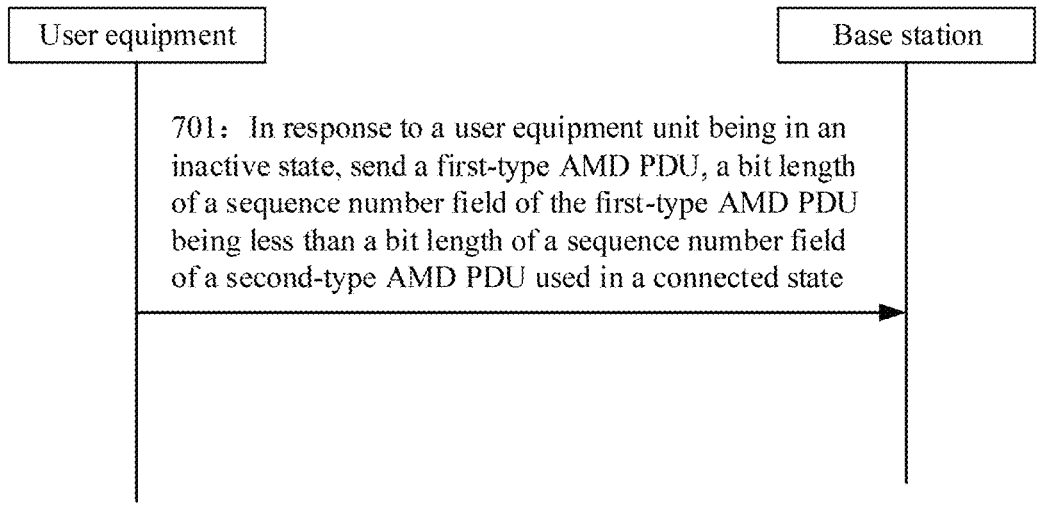
FIG. 7 is a schematic flowchart illustrating a method for data transmission according to an embodiment.

As shown in FIG. 7, the embodiment of the present disclosure provides a method for data transmission, which is applied to user equipment (UE) of a radio communication system. The method for data transmission can include:

step 701, in response to the UE being in an inactive state, a first type acknowledged mode data protocol data unit (AMD PDU) is transmitted.

Here, the first type AMD PDU can be an AMD PDU for transmitting and receiving data for the UL in the inactive state.

In some embodiments, the first type AMD PDU and a second type AMD PDU have at least following differences:

a bit length of a sequence number field of the first type AMD PDU is less than a bit length of a sequence number field of the second type AMD PDU used in a connected state.

In some embodiments, the second type AMD PDU can be an AMD PDU for the UE in the connected state.

Here, the radio communication system can include, but is not limited to, a radio communication system based on 5G cellular mobile communication technology.

In step 701, the inactive state can be the RRC inactive state. In the inactive state, a non-access stratum (NAS) layer is still in the connected state, and a state of the RRC layer is similar to an RRC idle state. When it is necessary to enter an RRC connected state, it is not necessary to re-establish an RRC connection, hut directly send a request for restoring the RRC connection to a network. The connected state can be the RRC connected state. In the connected state, the UE can establish an RRC connection with a base station for data transmission with the base station. When the UE is in the RRC idle state, since the RRC connection is not established, the UE cannot perform the data transmission with the base station. The AMD PDU can be an acknowledged mode RLC SDU.

An RLC entity of the UE receives the RLC SDU from an upper layer such as a packet data convergence protocol (PDCP) layer, encapsulates the received RIX SDU into the RLC PDU, and transmits the RLC PDU to an RIX entity of the base station through a lower layer; the RLC entity of the base station receives the RLC PDU through a lower layer, and submits the RLC SDU in the RUT PDU to an upper layer of the base station.

Figure 8:
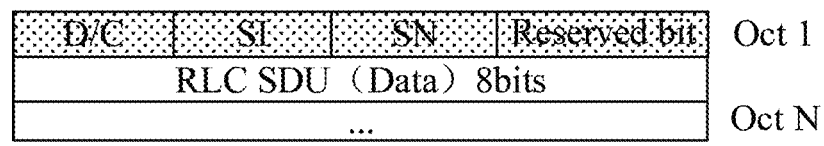
FIG. 8 is a schematic diagram illustrating a frame structure of an acknowledged mode data protocol data unit according to an embodiment.

The frame structure oldie AMD PDU can be shown in FIG. 8, and the sequence number (SN) field can be located at a position of a PDU frame header of the AMD PDU. The UE in the inactive state can receive the RLC SDU from the upper layer, add the PDU frame header to the received RLC SDU on the RLC layer, encapsulate the RLC SDU into the first type AMD PDU, and transmit the first type AMD PDU to the base station. Here, the RLC SDU can be small data with a relatively small amount of data, for example, bits occupied by the RLC SDU can be less than or equal to 4 bytes.

A bit length of the first type AMD PDU can be less than that of the second type AMD PDU. The first type AMD PDU can be configured to carry the small data when the UE is in the inactive state.

In the inactive state, since an amount of data transmitted is relatively small, that is, a number of the first type AMD PDUs transmitted is relatively small, the first type AMD PDU can use a Sequence number field with less bit length. In the connected state, since an amount of data transmitted is relatively large, that is, a number of the second type AMD PDU transmitted is relatively large, the second type AMD PDU can use a sequence number field with larger bit length. Exemplary, the sequence number field of the first type AMD PDU can occupy 2 bits. The sequence number field of the first type AMD PDU can occupy 18 bits.

The first type AMD PDU uses the sequence number field with less bit length, and an amount of data in the RLC SDU carried in the first type AMD PDU with the same bit length is larger.

In the inactive state, the UE transmits the first type AMD PDU, and the PDU frame header of the first type AMD PDU can carry identification information of the first type AMD PDU through the SN field. When the first type AMD PDU is not successfully received by the base station, the UE can retransmit the unsuccessfully received first type AMD PDU, and the base station can sort the received data according to the identification information of the first type AMD PDU carried by the sequence number field, so as to complete the reception and realize the data retransmission in the inactive state.

In this way, by transmitting the first type AMD PDU in the inactive state, the sequence number field with less bit length can be set in the first type AMD PDU, so that an amount of data in the RLC SDU carried in the first type AMD PDU with the same bit length is larger, thereby reducing bit overhead of the sequence number.

In one embodiment, transmitting the first type AMD PDU includes: transmitting the first type AMD PDU by common control channel (CCCH) resources.

When the UE in the RRC inactive state transmits the small data, since the amount of data transmitted is relatively small, a form of an RRC resume request combined with the small data can be used. The UE can transmit both the RRC resume request and the first type AMD PDU by the common control channel (CCCH) resources. Here, the small data can be the RLC SDU data with a quantity of bits less than or equal to 4 bytes.

In this way, by using the same type of resources to transmit the RRC resume request and the first type AMD PDU, resource allocation can be simplified and resource allocation efficiency can be improved.

In one embodiment, transmitting the first type AMD PDU by the CCCH resources includes:

transmitting the first type PDU carried by a signaling radio bearer (SRB) 0 by the CCCH resources.

The SRB0 can be used to carry RRC information on the CCCH, and in the inactive state, the SRB0 is only used to carry the AMD PDU. Here, the first type AMD PDU carried by the SRB0 is used to transmit on the CCCH. In this way, data types carried by the SRB0 are increased, and the utilization efficiency of the SRB0 is improved.

In one embodiment, a quantity of bits occupied by the sequence number field of the first type AMD PDU is less than or equal to 3.

In the inactive state, the amount of data transmitted by the UE is relatively small, and the number of the first type AMD PDUs is relatively small. The sequence number field configured to characterize a sequence number of the first type AMD PDUs can occupy less bit length.

The bit length of the sequence number field can be determined based on the bit length of the PDU frame header of the first type AMD PDU. Here, the sequence number field is located in the PDU frame header, and the bit length of the PDU frame header can be limited to one byte, so that more RLC SDU data can be carried in the first type AMD PDU with the same bit length.

The number of bits occupied by the sequence number field can be less than or equal to 3, for example, two bits can be occupied.

In one embodiment, the first type AMD PDU includes: a data control field configured to indicate a type of a radio link control service data unit (RLC SDU) in the first type AMD PDU.

As shown in FIG. 8, the data control (D/C) field can be set in the PDU frame header of the first type AMD PDU to indicate the type of the RLC SDU carried in the first type AMD PDU.

The type of the RLC SDU can include a data RLC SDU and a control RLC SDU. The data RLC SDU can be configured to carry data content, and the control RLC SDU can be configured to carry control instructions, and the like.

The data control field can occupy one bit or two bits, and different values are used to indicate the data RLC SDU and the control RLC SDU respectively.

Taking the data control field occupying two bits as an example, '00' can be used to indicate that the RLC SDU in the first type AMD PDU is the data RLC SDU, and "11" can be used to indicate that the RLC SDU to the first type AMD PDU is the control RLC SDU. Alternatively, "11" can be used to indicate that the RLC SDU in the first type AMD PDU is the data RLC SDU, and "00" can be used to indicate that the RLC SDU in the first type AMD PDU is the control RLC SDU.

After receiving the first type AMD PDU, the base station can determine the type of the RLC SDU in the first type AMD PDU according to the data control field.

In one embodiment, the RLC SDU includes: a data RLC SDU carrying data, wherein the data RLC SDU carries identification information of the UE.

In the inactive state, the identification information of the UE can include an inactive radio network temporary identifier (i-RNTI) and a message authentication code-integrity (MAC-I), and the like. The identification information may be carried in the data RLC SDU. Here, the MAC-1 can be an identity identifier generated by the UE and the base station using a key, security algorithm, bearer information, and the like under the base station and used for mutual verification. I-RNTI can occupy 40 bits or 24 bits.

After receiving the data RLC SDU, the base station can obtain the identification information carried in the data RLC SDU, and determine whether to receive the data RLC SDU based on the identification information carried in the data RLC SDU.

In this way, the security verification of the RLC SDU can be realized, and the reliability of data transmission can be improved.

Figure 9:
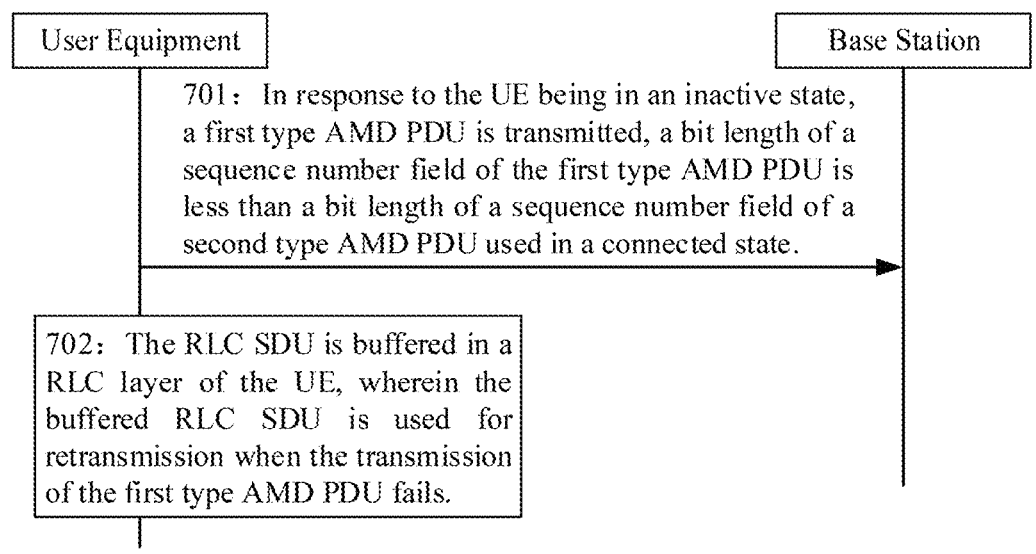
FIG. 9 is a schematic flowchart illustrating a method for data transmission according to an embodiment.

In one embodiment, as shown in FIG. 9, the method for data transmission can further include:

step 702, the RLC SDU is buffered in a RLC layer of the UE, wherein the buffered RLC SDU is used for retransmission when the transmission of the first type AMD PDU fails.

Here, when transmitting the first type AMD PDU, the UE can buffer the RLC SDU in the first type AMD PDU on the RLC layer.

When receiving the first type AMD PDU, the base station can feed back to the UE whether the first type AMD PDU has been received successfully by returning confirmation information, or other means.

When the base station feeds back that the first type AMD PDU fails to receive, the UE can retransmit the buffered RLC SDU.

When the confirmation information transmitted by be base station confirms that the buffered RLC SDU has been successfully received, the UE can delete the buffered RLC SDU, or can use a subsequent RLC SDU to cover the previously buffered RLC SDU. In this way, the situation of buffer overflow can be reduced.

In this way, the UE can directly retransmit the buffered data on the RLC layer without acquiring the retransmitted data from the upper layer, thereby improving the retransmission efficiency.

In one embodiment, the first type AMD PDU further includes: a segmentation information field configured to indicate a number of bytes occupied by the RLC SDU.

As shown in FIG. 8, the PDU frame header of the first type AMD PDU can further include the segmentation information (SI) field, which is configured to indicate the number of bytes occupied by the RLC SDU. The base station can determine the number of bytes occupied by the RIX SDU in the first type AMD PDU according to the segmentation information field.

In one embodiment, the RLC SDU is a first type RLC SDU, and a bit length of the first type RLC SDU is less than a bit length of a second type RLC SDU.

Here, the RLC SDU in the first type AMD PDU can be the first type RLC SDU. The first type RLC SDU can be a SDU with a relatively small amount of data. For example, the bit length of the first type RLC SDU can be less than or equal to 4 bytes. The bit length of the second type RLC SDU can be greater than 4 bytes.

Figure 10:
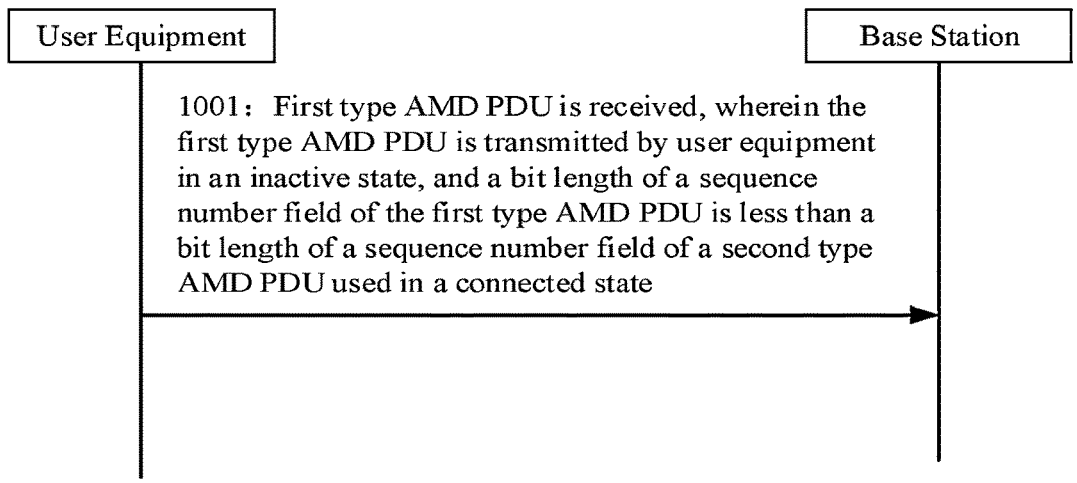
FIG. 10 is a schematic flowchart illustrating a method for data transmission according to an embodiment.

As shown in FIG. 10, the embodiment of the present disclosure provides a method for data transmission, which is applied to a base station of a radio communication system. The method for data transmission can include:

step 1001, a first type acknowledged mode data protocol data unit (AMD PDU) is received, wherein the first type. AMD PDU is transmitted by user equipment (UE) in an inactive state, and a bit length off sequence number field of the first type AMD PDU is less than a bit length of a sequence number field of a second type AMD PDU used in a connected state.

Here, the first type AMD PDU can be an AMD PDU for transmitting and receiving data for the UE in the inactive state.

In some embodiments, the first type AMD PDU and a second type AMD PDU have at least following differences:

a bit length of a sequence number field of the first type AMD PDU is less than a bit length of a sequence number field of the second type AMD PDU used in a connected state.

In some embodiments, the second type AMD PDU can be an AMD PDU for the UE in the connected state.

Here, the radio communication system can include, but is not limited to, a radio communication system based on 5G cellular mobile communication technology.

In step 1001, the inactive state can be the RRC inactive state. In the inactive state, a non-access stratum (NAS) layer is still in the connected state, and a state of the RRC layer is similar to an RRC idle state. When it is necessary to enter an RRC connected state, it is not necessary to re-establish an RRC connection, but directly send a request for restoring the RRC connection to a network. The connected state can be the RRC connected state. In the connected state, the UE can establish RRC connection with a base station for data transmission with the base station. When the UE is in the RRC idle state, since the RRC connection is not established, the UE cannot perform the data transmission with the base station. The AMD PDU can be an acknowledged mode RLC SDU.

An RLC entity of the UE receives the RLC SDU from an upper layer such as a packet data convergence protocol (PDCP) layer, encapsulates the received RLC SDU into the RLC PDU, and transmits the RLC PDU to an RLC entity of the base station through a lower layer; the RLC entity of the base station receives the RLC PDU through a lower layer, and submits the RLC SDU in the RLC PDU to an upper layer of the base station.

The frame Structure of the AMD PDU can be shown in FIG. 8, and the sequence number field can be located at a position of a PDU frame header of the AMD PDU. The UE in the inactive state can receive the RLC SDU from the upper layer, add the PDU frame header to the received RLC SDU on the RLC layer, encapsulate the RLC SDU into the first type AMD PDU, and transmit the first type AMD PDU to the base station. Here, the RLC SDU can be small data with a relatively small amount of data for example, bits occupied by the RLC SDU can be less than or equal to 4 bytes.

A bit length of the first type AMD PDU can be less than that of the second type AMD PDU. The first type AMD PDU can be configured to carry the small data when the UE is in the inactive state.

In the inactive state, since an amount of data transmitted is relatively small, that is, a number of the first type AMD PDUs transmitted is relatively small, the first type AMD PDU cart use a sequence number field with less bit length. In the connected state, since an amount of data transmitted is relatively large, that is, a number of the second type AMD PDU transmitted is relatively large, the second type AMD PDU can use a sequence number field with larger bit length.

Exemplary, the sequence number field of the first type AMD PDU can occupy 2 bits. The sequence number field of the first type AMD PDU can occupy 18 bits.

The first type AMD PDU uses the sequence number field with less bit length, and an amount of data in the RIX SDU carried in the first type Amp PDU with the same bit length is larger.

In the inactive state, the UE transmits the first type AMD PDU, and the PDU frame header of the first type AMD PDU can carry identification information of the first type AMD PDU through the SN field. When the first type AMD PDU is not successfully received by the base station, the UE can retransmit the unsuccessfully received first type AMD PDU, and the base station can sort the received data according to the identification information of the first type AMD PDU carried by the sequence number field, so as to complete the reception and realize the data retransmission in the inactive state.

In this way, by transmitting the first type AMD PDU in the inactive state, the sequence number field with less bit length can be set in the first type AMD PDU, so that an amount of data in the RLC SDU carried in the first type AMD PDU with the same bit length is larger, thereby reducing bit overhead of the sequence number.

In one embodiment, step 1001 can include: receiving the first type AMD PDU by common control channel (CCCH) resources.

When the UE in the RRC inactive state transmits the small data, since the amount of data transmitted is relatively small, a form of an RRC resume request combined with the small data can be used. The UE can transmit both the RRC resume request and the first type AMD PDU by the common control channel (CCCH) resources. Here, the small data can be the RLC SDU data with a quantity of bits less than or equal to 4 bytes.

In this way, by using the same type of resources to transmit the RRC resume request and the first type AMD PDU, resource allocation can be simplified and resource allocation efficiency can be improved.

In one embodiment, receiving the first type AMD PDU by the CCCH resources includes receiving the first type AMD PDU carried by a signaling radio bearer (SRB) 0 by the CCCH resources.

The first type AMD PDU carried by the SRB0 is transmitted by the CCCH resources.

The SRB0 can be used to carry RRC information on the CCCH, and in the inactive state, the SRB0 is only used to carry the TMD PDU. Here, the first type AMD PDU carried by the SRB0 is used to transmit on the CCCH. In this way, data types carried by the SRB0 are increased, and the utilization efficiency of the SRB0 is improved.

In one embodiment, a quantity of bits occupied by the sequence number field of the first type AMD PDU is less than or equal to 3.

In the inactive state, the amount of data transmitted by the UE is relatively small, and the number of the first type AMD PDUs is relatively small. The sequence number field configured to characterize a sequence number of the first type AMD PDUs can occupy less bit length.

The bit length of the sequence number field can be determined based on the bit length of the PDU frame header of the first type AMD PDU. Here, the sequence number field is located in the PDU frame header, and the bit length of the PDU frame header can be limited to one byte, so that mom RLC SDU data can be carried in the first type AMD PDU with the same bit length.

The number of bits occupied b the sequence number field can be less than or equal to 3, for example, two bits can be occupied.

In one embodiment, the first type AMD PDU includes a data control field, the method further includes: determining a type of a radio link control service data unit (RLC SDU) in the first type AMD PDU according to the data control field.

As shown in FIG. 8, the data control (DSC) field can be set in the PDU frame header of the first type AMD PDU to indicate the type of the RLC SDU carried in the first type AMD PDU.

The type of the RLC SDU can include a data RLC SDU and a control RLC SDU. The data RLC SDU can be configured to carry data content, and the control RIX SDU can be configured to carry control instructions, and the like.

The data control field can occupy one hit or two bits, and different values are used to indicate the data. RLC SDU and the control RLC SDU respectively.

Taking the data control field occupying two bits as an example, "00" can be used to indicate that the RLC SDU in the first type AMD PDU is the data RLC SDU, and "11" can be used to indicate that the RLC SDU in the first type AMD PDU is the control RLC SDU. Alternatively, "11" can be used to indicate that the RLC SDU in the first type AMD PDU is the data RLC SDU, and "00" can be used to indicate that the RLC SDU in the first type AMD PDU is the control SDU.

After receiving the first type AMD PDU, the base station can determine the type of the RLC SDU in the first type AMD PDU according to the data control field.

In one embodiment, the method for data transmission can further include: obtaining identification information of the UE carried in the data RLC SDU when the RLC SDU is a data RLC SDU carrying data.

In the inactive state, the identification information of the UE can include an inactive radio network temporary identifier (I-RNTI) and a message authentication code-integrity MAC-I), and the like. The identification information may be carried in the data RLC SDU. Here, the MAC-I can be an identity identifier generated by the UE and the base station using a key, security algorithm, bearer information, and the like under the base station and used for mutual verification, I-RNTI can occupy 40 bits or 24 bits.

After receiving the data RLC SDU, the base station can obtain the identification information carried in the data RLC SDU, and determine whether to receive the data RLC SDU based on the identification information carried in the data RLC SDU.

In this way, the security verification of the RLC SDU can be realized, and the reliability of data transmission can be improved.

Figure 11:
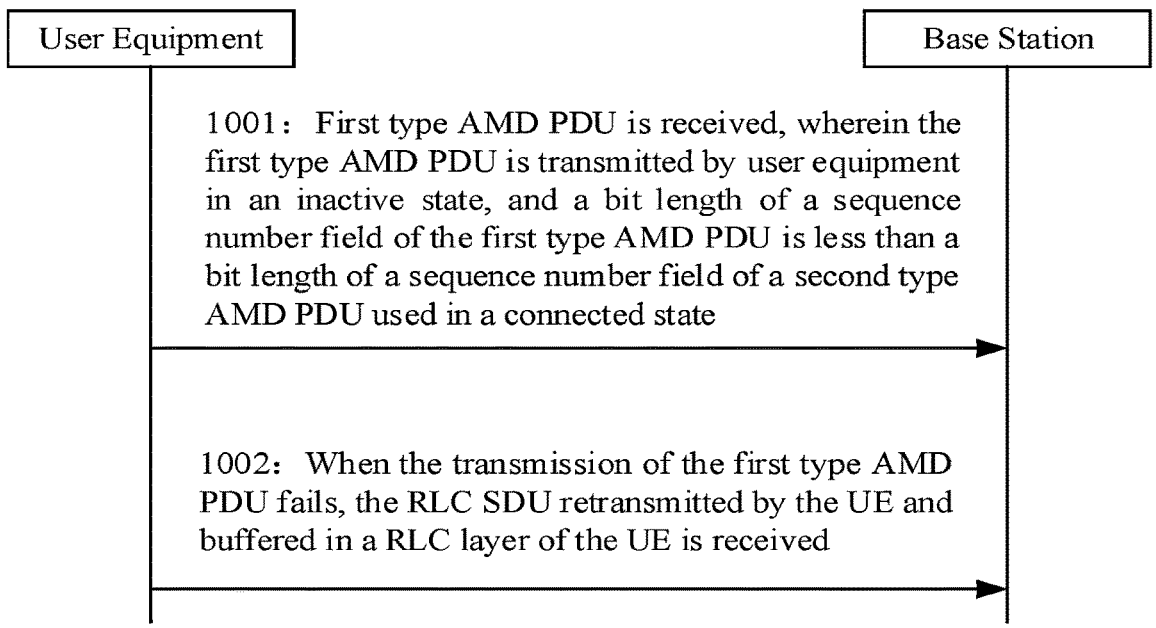
FIG. 11 is schematic flowchart illustrating a method for data transmission according to an embodiment.

In one embodiment, as shown in FIG. 11, the method for data transmission can further include:

step 1002, when the transmission of the first type AMD PDU fails, the RLC SDU retransmitted, by the UE and buffered in a RLC layer of the UE is received.

Here, when transmitting the first type AMD PDU, the UE can buffer the RLC SDU the first type AMD PDU on the RLC layer.

When receiving the first type AMD PDU, the base station can feed back to the UE whether the first type AMP PDU has been received successfully by returning confirmation information, or other means.

When the base station feeds back that the first type AMD PDU fails to receive, the UE can retransmit the buffered RLC SDU.

When the confirmation information transmitted by the base station confirms that the buffered RLC SDU has been successfully received, the UE can delete the buffered RLC SDU, or can use a subsequent RLC SDU to cover the previously buffered RLC SDU. In this way, the situation of buffer overflow can be reduced.

In this way, the HE can directly retransmit the buffered data on the RLC layer without acquiring the retransmitted data from the upper layer, thereby improving, the retransmission efficiency.

In one embodiment, the first type AMD PDU further includes a segmentation information field, the method for data transmission can further include: determining a number or bytes occupied by the RLC SDU according to the segmentation information field.

As shown in FIG. 8, the PDU frame header of the first type AMD PDU can further include the segmentation information (SI) field, which is configured to indicate the number of bytes occupied by the RLC SDU. The base station can determine the number of bytes occupied by RLC SDU in the first type AMD PDU according to the segmentation information field.

In one embodiment, the RLC SDU is a first type RLC SDU, and a bit length of the first type RLC SDU is less than a bit length of a second type RLC SDU.

Here, the RLC SDU in the first type AMD PDU can be the first type RLC SDU. The first type RLC SDU can be a SDU with a relatively small amount of data. For example, the bit length of the first type RLC SDU can be less than or equal to 4 bytes. The bit length of the second type RLC SDU can be greater than 4 bytes.

A specific example is provided below in combination with any of the above-mentioned embodiments.

This example provides an AMD PDU.

1. The frame structure of the AMD PDU is shown in FIG. 8. The AMD PDU can include:

a) D/C (data/control) field, which can occupy 2 bits. D represents data, C represents control. The DC field can be identified by two bits, for example, "00" can be used to indicate that the AMD PDU contains the data RLC SDU. The data RLC SDU can contain an UE ID (I-RNTI) and MAC-I.

b) SI (segmentation Information) field, which can occupy 2 bits. The SI field identifies the number of bytes occupied by the RLC SDU of the SI field.

c) SN field, which can occupy 2 bits. The SN field identifies the sequence number of the AMD PDU.

2. The AM RLC is allowed to transmit the AMD PDU from the CCCH. The AMD PDU can be carried using the SRB0.

3. The UE can buffer the UE ID and the small data on the RLC layer, where the small data can be the RLC SDU.

Figure 12:
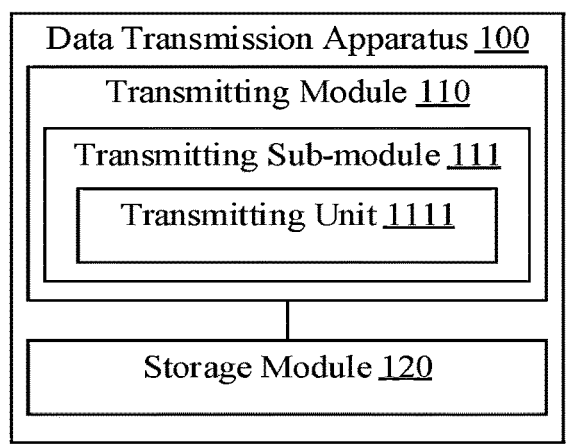
FIG. 12 is a block diagram illustrating an apparatus for data transmission according to an embodiment.

The embodiments of the present disclosure further provide an apparatus for data transmission, which is applied to user equipment (UE). FIG. 12 is a schematic structural diagram illustrating an apparatus 100 for data transmission according to an embodiment of the present disclosure. As shown in FIG. 12, the apparatus 100 for data transmission includes a transmitting module 110.

The transmitting module 110 is configured to, in response to the UE being in an inactive state, transmit a first type acknowledged mode data protocol data unit (AMD PDU), wherein a bit length of a sequence number field of the first type AMD PDU is less than a bit length of a sequence number field of a second type AMD PDU used in a connected state.

In one embodiment, the transmitting module 110 includes:

a transmitting sub-module 111 configured to transmit the first type AMD PDU by common control channel (CCCH) resources.

In one embodiment, the transmitting sub-module 111 includes:

a transmitting unit 1111 configured to transmit the first type AMD PDU carried by a signaling radio bearer (SRB) 0 by the CCCH resources.

In one embodiment, a quantity of bits occupied by the sequence number field of the first type AMD PDU is less than or equal to 3.

In one embodiment, the first type AMD PDU includes: a data control field configured to indicate a type of a radio link control service data unit (RLC SDU) in the first type AMD PDU.

In one embodiment, the RLC SDU includes: a data RLC SDU carrying data;

wherein the data RLC SDU carries identification information of the UE.

In one embodiment, the apparatus 100 for data transmission further includes:

a storage module 120 configured to buffer the RLC SDU in a RLC layer of the UE, wherein the buffered RLC SDU is used for retransmission when the transmission of the first type AMD PDU fails.

In one embodiment, the first type AMD PDU further includes: a segmentation information field configured to indicate a number of bytes occupied by the RLC SDU.

In one embodiment, the RLC SDU is a first type RLC SDU, and a bit length of the first type RLC SDU is less than a bit length of a second type RLC SDU.

Figure 13:
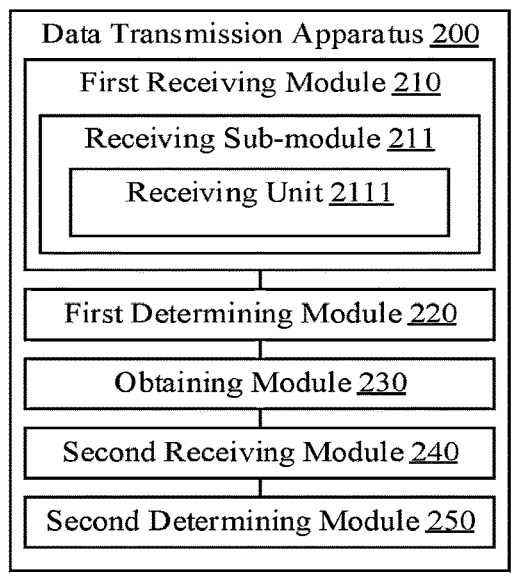
FIG. 13 is a block diagram illustrating an apparatus for data transmission according to an embodiment.

The embodiments of the present disclosure further provide an apparatus for data transmission, which is applied to a base station. FIG. 13 is a schematic structural diagram illustrating an apparatus 200 for data transmission according to an embodiment of the present disclosure. As shown in FIG. 13, the apparatus 200 for data transmission, includes a first receiving module 210.

The first receiving module 210 is configured to receive a first type acknowledged mode data protocol data unit (AMD PDU), wherein the first type AMD PDU is transmitted by user equipment (UE) in an inactive state, and a bit length of a sequence number field of the first type AMD PDU is less than a bit length of a sequence number field of a second type AMD PDU used in a connected state.

In one embodiment, the first receiving module 210 includes:

a receiving sub-module 211 configured to receive the first type AMD PDU by common control channel (CCCH) resources.

In one embodiment, the receiving sub module 211 includes:

a receiving unit 2111 configured to receive the first type AMD PDU carried by signaling radio bearer (SRB) 0 by the CCCH resources.

In one embodiment, a quantity of bits occupied by the sequence number field of the first type AMD PDU is less than or equal to 3.

In one embodiment, the first type AMD PDU includes: a data control field, the apparatus 200 for data transmission further includes:

a first determining module 220 configured to determine a type of a radio link control service data unit (RLC SDU) in the first type AMD PDU according to the data control field.

In one embodiment, the apparatus 200 for data transmission further includes:

an obtaining module 230 configured to obtain identification information of the UE carried in the data RLC SDU when the RLC SDU is a data RLC SDU carrying data.

In one embodiment, the apparatus 200 for data transmission further includes:

a second receiving module 240 configured to receive the RLC SDU retransmitted by the UE and buffered in a RLC layer of the UE when the transmission of the first type AMD PDU fails.

In one embodiment, the first type AMD PDU further includes: a segmentation information field, the apparatus 200 for data transmission further includes:

a second determining module 250 configured to determine a number of bytes occupied by the RLC SDU according to the segmentation information field.

In one embodiment, the RLC SDU is a first type RLC SDU, and a bit length of the first type RLC SDU is less than a bit length of a second type RLC SDU.

In an embodiment, the transmitting module 110, the storage module 120, the first receiving module 210, the first determining module 220, the obtaining module 230, the second receiving module 240, the second determining module 250, and the like can be implemented by one or more central processing units (CPUs), graphic processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors, or other electronic components; or can also be implemented in combination with one or more radio frequency (RP) antennas, for executing the above-mentioned method.

Figure 14:
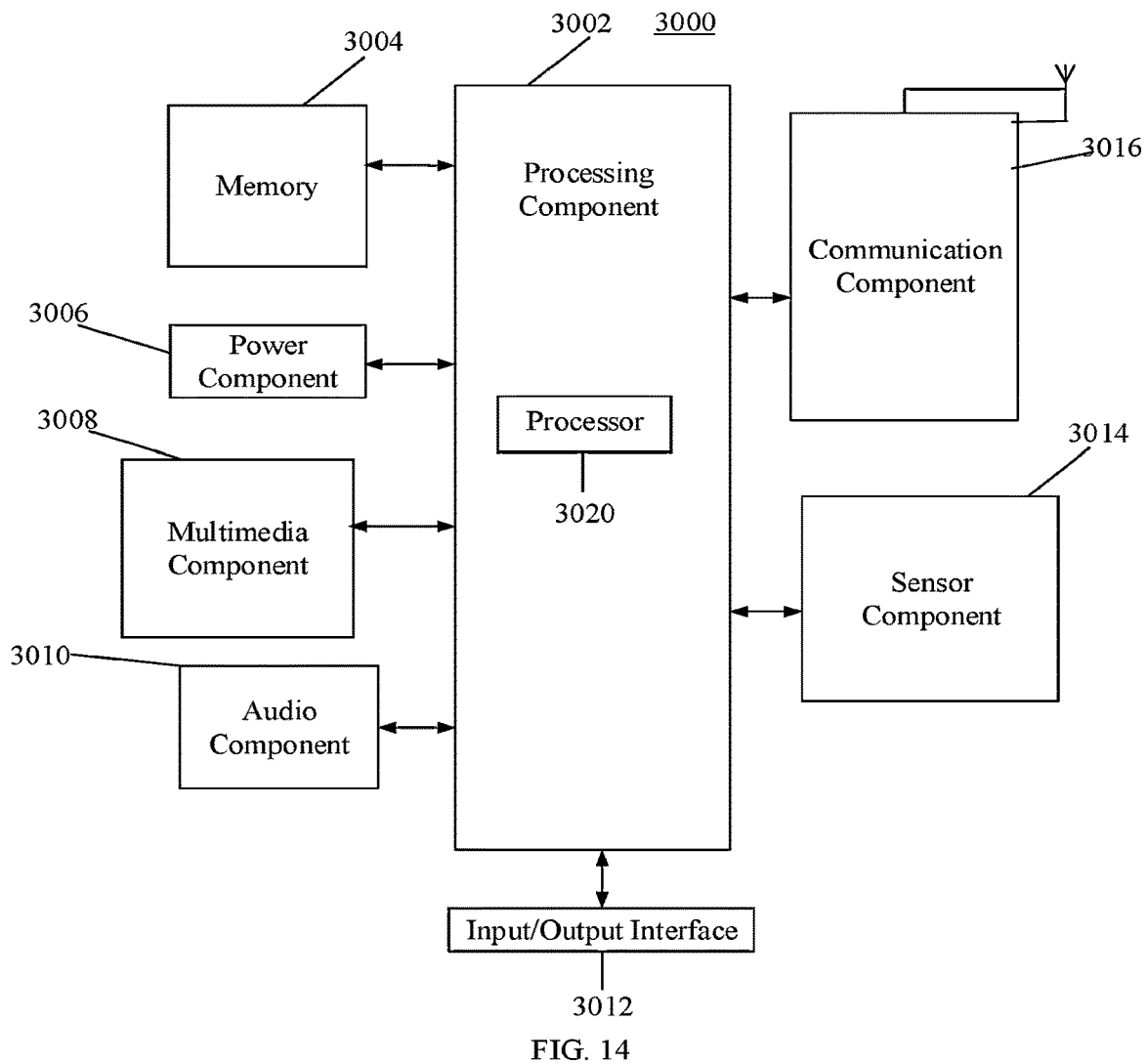
FIG. 14 is a block diagram illustrating an apparatus for data trap mission according to an embodiment.

FIG. 14 is a block diagram illustrating an apparatus 3000 for data transmission according to an embodiment. For example, the apparatus 3000 may be a mobile telephone, a computer, a digital broadcasting terminal, a message receiving and transmitting device, a game console, a tablet device, a medical device, a fitness device, a personal digital assistant, and so on.

Referring to FIG. 13, the apparatus 3000 may include one or more of the following components: a processing component 3002, a memory 3004, a power supply component 3006, a multimedia component 3008, an audio component 3010, an input/output (I/O) interface 3012, a sensor component 3014 and a communication component 3016.

The processing component 3002 generally controls overall operations of the apparatus 3000, such as operations associated with display, phone calls, data communications, camera operations, and recording operations. The processing component 3002 may include one or more processors 3020 to execute instructions to complete all or part of the steps of the above methods. In addition, the processing component 3002 may include one or more modules which facilitate the interaction between the processing component 3002 and other components. For example, the processing component 3002 may include a multimedia module, to facilitate the interaction between the multimedia component 3008 and the processing component 3002.

The memory 3004 is to store various types of data to support the occupation of the apparatus 3000. Examples of such data include instructions for any application or method operated on the apparatus 3000, contact data, phonebook data, messages, pictures, videos, and so on. The memory 3004 may be implemented by any type of volatile or non-volatile storage devices or a combination thereof, such as a Static Random-Access Memory (SRAM), an Electrically-Erasable Programmable Read Only Memory (EEPROM), an Erasable?Programmable?Read?Only?Memory (EPROM), a Programmable read-only memory (PROM), a Read Only Memory (ROM), a magnetic memory, a flash memory, a magnetic or optical disk.

The power supply component 3006 provides power to different components of the apparatus 3000. The power supply component 3006 may include a power management system, one or more power supplies, and other components associated with generating, managing, and distributing power for the apparatus 3000.

The multimedia component 3008 includes a screen providing an output interface between the apparatus 3000 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense duration and a pressure associated with the touch or swipe. In some embodiments, the multimedia component 3008 may include a front camera and/or a rear camera. The front camera and/or rear camera may receive external multimedia data when the apparatus 3000 is in an operating mode, such as a photographing mode or a video mode. Each of the front camera and the rear camera may be a fixed optical lens system or have focal length and optical zooming capability.

The audio component 3010 is configured to output and/or input an audio signal. For example, the audio component 3010 includes a microphone (MIC). When the apparatus 3000 is in an operating mode, such as a call mode, a recording mode, and a voice recognition mode, the MIC is to receive an external audio signal. The received audio signal may be further stored in the memory 3004 or transmitted via the communication component 3016. In some embodiments, the audio component 3010 further includes a speaker to output an audio signal.

The I/O interface 3012 may provide an interface between the processing component 3002 and peripheral interface modules. The above peripheral interface modules may include a keyboard, a click wheel, buttons and so on. These buttons may include, but are not limited to, a home button, a volume button, a starting button and a locking button.

The sensor component 3014 includes one or more sensors to provide status assessments of various aspects for the apparatus 3000. For example, the sensor component 3014 may detect the on/off status of the apparatus 3000, and relative positioning of component, for example, the component is a display and a keypad of die apparatus 3000. The sensor component 3014 may also detect a change in position of the apparatus 3000 or a component of the apparatus 3000, a presence or absence of the contact between a user and the apparatus 3000, an orientation or an acceleration/deceleration of the apparatus 3000, and a change in temperature of the apparatus 3000. The sensor component 3014 may include a proximity sensor to detect the presence of a nearby object without any physical contact. The sensor component 3014 may further include an optical sensor, such as a Complementary Metal Oxide Semiconductor (CMOS) or Charge-coupled Device (CCD) image sensor which is used in imaging applications. In some embodiments, the sensor component 3014 may further include an acceleration sensor, a gyroscope sensor, a magnetic sensor, a pressure sensor, or a temperature sensor.

The communication component 3016 is to facilitate wired or wireless communication between the apparatus 3000 and other devices. The apparatus 3000 may access a wireless network that is based on a communication standard, such as Wi-Fi, 2G or 3G, or a combination thereof. In an embodiment, the communication component 3016 receives a broadcast signal or broadcast-associated information from an external broadcast management system via a broadcast channel. In an embodiment, the communication component 3016 further includes a Near Field Communication (NFC) module to facilitate short-range communications. For example, the NFC module may be implemented based on a Radio Frequency identification (RFID) technology, an Infrared Data Association (IrDA) technology, an Ultra-Wide Band (UWB) technology, a Blue Tooth (BT) technology and other technologies.

In an embodiment, the apparatus 3000 may be implemented by one or more Application Specific Integrated Circuits (ASICs), Digital Signal Processors (DSPs), Digital Signal Processing Devices (DSPDS). Programmable Logic Devices (PLDs), Field Programmable Gate Arrays (FPGAs), controllers, microcontrollers, microprocessors, or other electronic components for performing the above method.

In an embodiment, there is also provided a non-transitory computer-readable storage medium including instructions, such as the memory 3004 including instructions. The instructions may be executed by the processor 3020 of the apparatus 3000 to perform the above described methods. For example, the non-transitory computer-readable storage medium may be a ROM, a Random Access Memory (RAM), a CD-ROM, a magnetic tape, a floppy disk, an optical data storage device, and the like.

With the method and apparatus for data transmission, and the communication device provided by the embodiments of the present disclosure, in response to user equipment (UE) being in an inactive state, the UE transmits a first type acknowledged mode data protocol data unit (AMD PDU), wherein a bit length of a sequence number field of the first type AMD PDU is less than a bit length of a sequence number field of a second type AMD PDU used in a connected state. By transmitting the first type AMD PDU in the inactive state, the sequence number field with less bit length can be set in the first type AMD PDU, so that an amount of data in a radio link control service data unit (RLC SDU) carried in the first type AMD PDU with the same bit length is larger, thereby reducing bit overhead of the sequence number.

Other implementations of the embodiments of the present disclosure will be apparent to those skilled in the art from consideration of the specification and practice of the present disclosure herein. The embodiments of the present disclosure is intended to cover any variations, uses, modification or adaptations of the embodiments of the present disclosure that follow the general principles thereof and include common knowledge or conventional technical means in the related art that are not disclosed in the embodiments of the present disclosure. The specification and embodiments are exemplary only, with a true scope and spirit of the embodiments of the present disclosure being indicated by the following claims. It is to be understood that the embodiments of the present disclosure is not limited to the precise structure described above and shown in the accompanying drawings, and that various modifications and changes may be made without departing from the scope thereof. The scope of the embodiments of the present disclosure is limited only by the appended claims.

The invention claimed is:

1. A method for data transmission performed by a user equipment (UE), comprising:
   determining whether the UE is in an inactive state; and
   in response to the UE being in the inactive state, transmitting a first type acknowledged mode data protocol data unit (AMD PDU), wherein a bit length of a sequence number field of the first type AMD PDU is set to be less than a bit length of a sequence number field of a second type AMD PDU used in a connected state, wherein the first type AMD PDU is an AMD PDU for transmitting and receiving data for the UE in the inactive state, and the second type AMD PDU is an AMD PDU for the UE in the connected state;
   wherein the first type AMD PDU comprises: a data control field configured to indicate a type of a radio link control service data unit (RLC SDU) in the first type AMD PDU;
   wherein the RLC SDU comprises a data RLC SDU carrying data, wherein the data RLC SDU carries identification information of the UE.

2. The method according to claim 1, wherein transmitting the first type AMD PDU comprises:
   transmitting the first type AMD PDU by common control channel (CCCH) resources.

3. The method according to claim 2, wherein transmitting the first type AMD PDU by the CCCH resources comprises:
   transmitting the first type AMD PDU carried by a signaling radio bearer (SRB) 0 by the CCCH resources.

4. The method according to claim 1, wherein a quantity of bits occupied by the sequence number field of the first type AMD PDU is less than or equal to 3.

5. The method according to claim 1, further comprising:
   buffering the RLC SDU in a RLC layer of the UE, wherein the buffered RLC SDU is used for retransmission when the transmission of the first type AMD PDU fails.

6. The method according to claim 1, wherein the first type AMD PDU further comprises:
   a segmentation information field configured to indicate a number of bytes occupied by the RLC SDU.

7. The method according to claim 1, wherein the RLC SDU is a first type RLC SDU, and a bit length of the first type RLC SDU is less than a bit length of a second type RLC SDU.

8. A method for data transmission performed by a base station, comprising:
   receiving a first type acknowledged mode data protocol data unit (AMD PDU), wherein the first type AMD PDU is transmitted by user equipment (UE) in an inactive state, and a bit length of a sequence number field of the first type AMD PDU is set to be less than a bit length of a sequence number field of a second type AMD PDU used in a connected state, wherein the first type AMD PDU is an AMD PDU for transmitting and receiving data for the UE in the inactive state, and the second type AMD PDU is an AMD PDU for the UE in the connected state;
   wherein the first type AMD PDU comprises a data control field, and the method further comprises: determining a type of a radio link control service data unit (RLC SDU) in the first type AMD PDU according to the data control field;
   wherein the method further comprises: obtaining identification information of the UE carried in a data RLC SDU when the RLC SDU is the data RLC SDU carrying data.

9. The method according to claim 8, wherein receiving the first type AMD PDU comprises:
   receiving the first type AMD PDU by common control channel (CCCH) resources.

10. The method according to claim 9, wherein receiving the first type AMD PDU by the CCCH resources comprises:
    receiving the first type AMD PDU carried by a signaling radio bearer (SRB) 0 by the CCCH resources.

11. The method according to claim 8, wherein a quantity of bits occupied by the sequence number field of the first type AMD PDU is less than or equal to 3.

12. The method according to claim 8, further comprising:
    receiving the RLC SDU retransmitted by the UE and buffered in a RLC layer of the UE when the transmission of the first type AMD PDU fails.

13. The method according to claim 8, wherein the first type AMD PDU further comprises a segmentation information field, the method further comprises:
    determining a number of bytes occupied by the RLC SDU according to the segmentation information field.

14. The method according to claim 8, wherein the RLC SDU is a first type RLC SDU, and a bit length of the first type RLC SDU is less than a bit length of a second type RLC SDU.

15. A user equipment (UE), comprising:
    a processor;
    a transceiver;
    a memory; and
    an executable program stored in the memory and capable of being run on the processor,
    wherein when running the executable program, the processor is configured to perform:
    determining whether the UE is in an inactive state; and
    in response to the UE being in the inactive state, transmitting a first type acknowledged mode data protocol data unit (AMD PDU), wherein a bit length of a sequence number field of the first type AMD PDU is set to be less than a bit length of a sequence number field of a second type AMD PDU used in a connected state, wherein the first type AMD PDU is an AMD PDU for transmitting and receiving data for the UE in the inactive state, and the second type AMD PDU is an AMD PDU for the UE in the connected state;
    wherein the first type AMD PDU comprises: a data control field configured to indicate a type of a radio link control service data unit (RLC SDU) in the first type AMD PDU;
    wherein the RLC SDU comprises a data RLC SDU carrying data, wherein the data RLC SDU carries identification information of the UE.

16. A base station comprising a processor, a transceiver, a memory and an executable program stored in the memory and capable of being run on the processor, wherein the processor is configured to, when running the executable program, execute the steps of the method for data transmission according to claim 8.

* * * * *